Patented Oct. 9, 1945

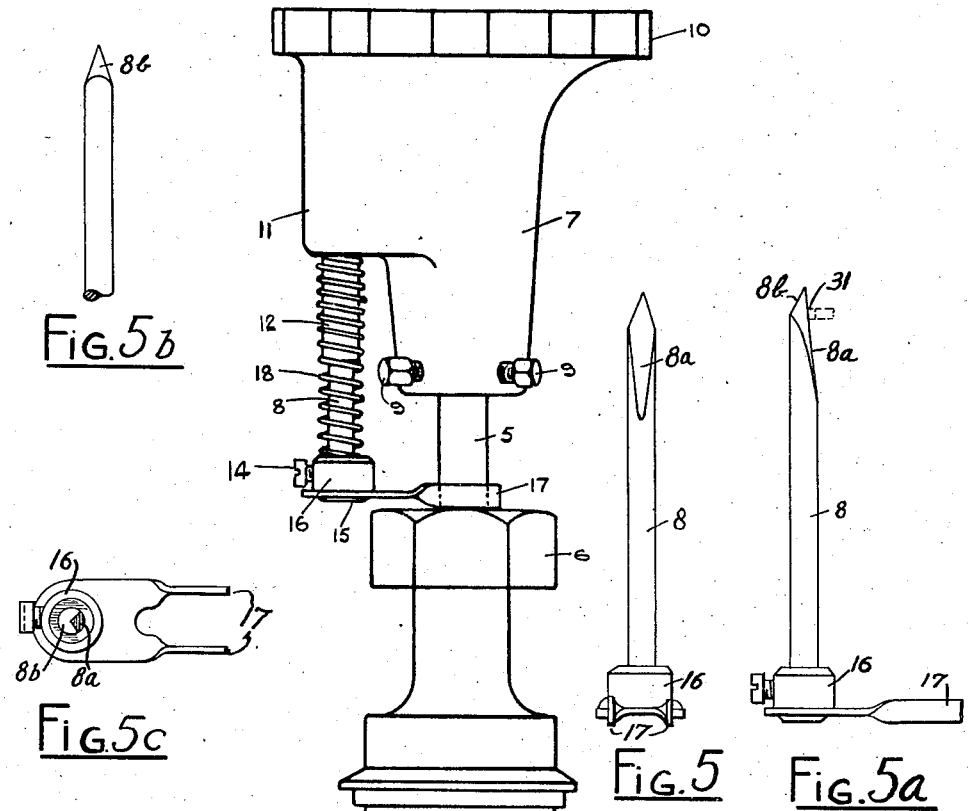

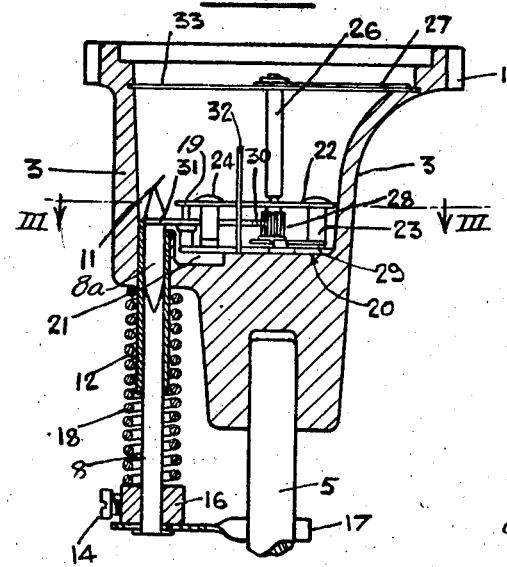
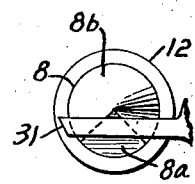
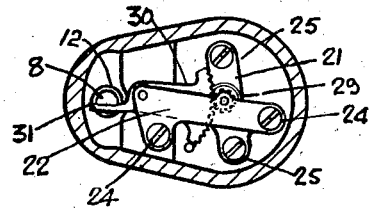
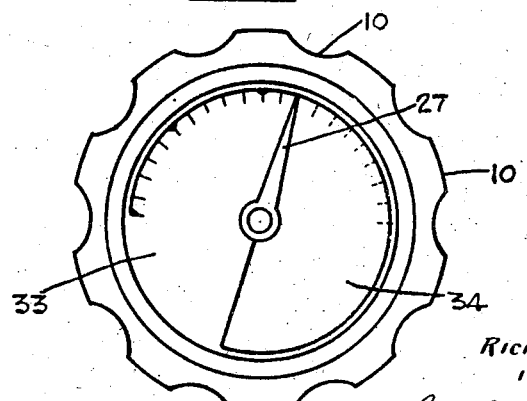

2,386,413

UNITED STATES PATENT OFFICE 2,386,413

VALVE POSITION INDICATOR

Richard Fife Walker, Cheltenham, England, assignor to Walker, Crosweller & Company Limited, Cheltenham, England Application January 6, 1943, Serial No. 471,426
In Great Britain December 31, 1941

4 Claims. (Cl. 116—125)

This invention has reference to valves, more particularly to valves for use in connection with fluid supply lines, and has for its principal object to provide improved means for giving readily visible indication of the position of a valve relatively to its seating; that is to say, for indicating whether the valve is closed or open, and if the later, the extent to which it has been opened.

Another object of the invention is to provide for the adjustment of the said valve position indicating means so that it may be rendered suitable for use with valves of varying sizes or varying throws or strokes between their fully closed and fully open positions.

A further object of the invention is to provide valve position indicating means of simple, robust and compact construction.

A still further object of the invention is to provide valve position indicating means having actuating mechanism which is reliable and accurate in operation and comprises a minimum number of component parts, thereby reducing the possibility of breakdown, facilitating assembly and lessening assembly and maintenance costs.

Other objects of the invention will be apparent from the following description and the drawings accompanying this specification.

In the said accompanying drawings, Figure 1 is an elevation of a valve provided with position indicating means and assembled in a fluid pipe line.

Figure 2 is a sectional elevation of the valve position indicator shown in Figure 1.

Figure 3 is a sectional plan along the line 3—3, Figure 2.

Figure 3a is a view showing a portion of Figure 3 to enlarged scale.

Figure 4 is a plan of Figure 2.

Figures 5, 5a, and 5b show in elevation and plan the rod and shoe assembly which actuates the indicator. Figure 5c shows, in elevation, one end of the rod only, the view being taken from the reverse side to that shown in Figure 5.

The valves shown in Figure 1, each comprises a body 1 having tapped inlet and outlet ports 2 and 3, adapted to be connected to the ends of the pipes 4 to enable the valve to be inserted in a fluid supply line. The valve actuating means comprises a spindle 5 which extends through a fluid-tight gland in the top of the body 1. The valve position indicator comprises a casing 7 which contains mechanism adapted to be actuated by a rod 8.

In the valve shown in Figure 1, the casing 7 is mounted on the end of the valve-operating spindle 5 in place of the usual operating wheel or handle. This end of the casing is socketted on to the spindle and is provided with a series of grub or set screws 9 which are tightened on to the said spindle for holding the casing securely in position so that no relative movement between spindle and casing can take place. The uppermost end of the casing is of enlarged diameter and its external periphery 10 is knurled or otherwise formed so that the said casing end may be gripped for rotating the casing and spindle and operating the valve.

The casing 7 is formed with a lateral pocket 11 having an aperture in the bottom thereof in which a guide sleeve 12 is secured. The rod 8 extends through the said sleeve into the pocket 11, and is thus located parallel with, but to one side of, the valve spindle 5. The lower or outer end of the rod is fitted with a shoe 15 which seats upon and is adapted to rotate relatively to the gland nut 6.

The upper end of the rod 8, located within the pocket 11, tapers to a point (see Figure 5), the angle of the taper varying around the periphery of the said rod.

The shoe 15 comprises a collar 16 through which the rod 8 extends and which is provided with a grub screw 14 adapted to be tightened or screwed down on to the said rod for adjustably securing the shoe to the latter. The shoe is also formed with two parallel fingers 17 which embrace the valve spindle 5 and assist to retain the shoe and rod in position relatively to the valve spindle. A coil spring 18 is carried around the rod 8 and sleeve 12, the said spring being compressed between the underside of the pocket 11 and the collar 16, thereby retaining the shoe in contact with the gland nut 6.

Mechanism 19, adapted to give readily visible indication of the position or setting of the valve, is carried upon a platform 20 formed within the casing 7. This mechanism comprises two parallel plates 21, 22, the plate 21 being fixed close to the platform 20 by screws 25, whereas the plate 22 is spaced from the plate 21 by distance pieces 23 disposed around screws 24 which secure the two plates together. A spindle 26 is journalled in the plates 21, 22, and extends towards the mouth of the casing where it carries a pointer 27. Intermediate the said plates 21, 22, the spindle 26 carries a toothed pinion 28 and a hair spring 29, one end of the latter being fixed to the spindle whereas the other and outer end abuts against one of the distance pieces 23 and is thereby prevented from moving. The pinion 28 meshes with the teeth of a quadrant 30 rotatably mounted between the plates 21, 22, and having a tail piece 31 which extends into the pocket 11 and is retained in resilient engagement with the tapered end of the rod 8 by the hair spring 29 acting through the pinion and quadrant.

A stop 32 is fitted within the casing 7 in the path of the quadrant for limiting the spring-driven movement of the latter.

A dial 33, having a graduated scale marked upon one half of the periphery of its exposed surface, is retained within the mouth of the casing 7, the said dial having a central aperture through which the spindle 26 extends to enable the pointer 27 to be located above and to move over the scale. The dial and pointer are normally protected by a glass disc secured within the mouth of the casing above the dial, in any known suitable manner.

The pointer 27 is fixed, or otherwise arranged in fixed relationship, to one edge of a semi-circular shutter 34 of translucent or opaque material. The shutter has a diameter substantially equal to the diameter of the dial 33 and, when the valve is fully closed, covers the graduated scale on the half of the dial; the position of the dial, which is then exposed, may be marked with the word "closed." As the valve is opened the pointer and shutter move around the dial so as gradually to expose the graduated scale until, when the valve is fully open, the pointer reaches a marking such as "open" and the whole scale is fully exposed. The provision of the shutter would facilitate the reading of the indicator in a poor light. In Figure 4 the pointer and shutter are in a position which shows that the valve is slightly more than half open.

It will be seen that, on rotating the casing 7 by the knurled periphery 10, the valve spindle will be rotated and the valve moved towards its fully open or closed position. Further, as the casing is rotated it will cause the rod 8 to travel round the valve spindle and the shoe 15 to swing around upon the gland nut 6. Moreover the opening or closing of the valve will cause the casing to move away from or towards the said gland nut so that the tapered end of the rod will project to a lesser or greater distance into the pocket 11. This longitudinal movement of the casing 7 relatively to the rod 8 causes the quadrant tail 31 to travel along the tapered end of the said rod; the quadrant will therefore be displaced about its pivot and will drive the pinion 28 and shaft 26 with the result that the pointer 27 and shutter 34 will travel over the graduated scale on the dial 33. This displacement of the pointer is initiated by the tapered end of the rod when the latter is caused to project further into the pocket 11 and by the hair spring 29, maintaining the tail in contact with the rod, when the latter is being withdrawn from the pocket.

It will be further appreciated that as the distance between the casing and gland nut is increasing, the compression spring 18, acting on the collar 16 retains the shoe 15 on the gland nut so that relative movement between the casing and rod is ensured and this extent of relative movement will depend upon the longitudinal travel of the valve spindle.

By releasing the grub screw 14, the rod 8 may be rotated within the collar 16 and reclamped by tightening the said screw. In this manner a different portion of the tapered upper end of the rod may be presented to the quadrant tail; for instance, the portion $8^a$ may be presented to the said tail instead of the portion $8^b$. It will be seen from Figures 5, 5a, and 5c that these two portions are inclined at greatly different angles to the axis of the rod, and that when the tail is in contact with the face $8^a$ a much greater longitudinal travel of valve spindle will be required to swing the pointer 7 from the "fully closed" to the "fully open" position, than when the tail is in contact with the portion $8^b$. Thus, by rotating the rod within the collar 16, the indicator may be adjusted for use with valves of varying sizes or with valves having varying distances of travel between their extreme positions. If necessary, the rod may also be adjusted by displacing it axially within the bush.

Having described my invention what I claim and desire to secure by Letters Patent is:

1. For use in connection with a valve having an operating spindle, a valve-position indicator comprising a casing adapted to be clamped to the said spindle, a graduated dial in the casing, a pointer adapted to move over the dial under the action of a pivoted toothed quadrant within the said casing and meshing with a pinion rigid with said pointer, a rod terminating inside the casing in a surface which is inclined to, and is in contact with, a portion of said quadrant, the rod being caused to project to a greater or lesser distance into the casing when the valve spindle is rotated, thus causing said inclined surface to ride over said portion of the quadrant for imparting angular movement to the latter and turning the pointer.

2. For use in connection with a valve having an operating spindle, a valve-position indicator comprising a casing adapted to be clamped to the said spindle, a graduated dial in the casing, a pointer adapted to move over the dial under the action of a toothed quadrant pivoted within the said casing and meshing with a pinion rigid with the pointer, said quadrant having a tail-piece extending from its pivot, and a rod terminating within the casing in a surface which is inclined relatively to, and is in contact with, said tail-piece, the rod being caused to project to a greater or lesser distance into the casing when the valve spindle is rotated, thus causing said inclined surface to ride over said tail-piece for imparting angular movement thereto and to the quadrant, and turning the pointer spindle.

3. For use in connection with a valve having an operating spindle, a valve-position indicator comprising a casing adapted to be clamped to the said spindle, a graduated dial in the casing, a pointer mounted on a spindle and adapted to move over the dial under the action of a toothed quadrant pivoted within the said casing and meshing with a pinion fast on said pointer spindle, a tail-piece on the said quadrant, and a rod terminating inside the casing in a plurality of surfaces inclined at different angles relative to the tail-piece, with which any one of said surfaces is adapted to be brought into contact, the rod being caused to project to a greater or lesser distance into the casing when the valve spindle is rotated to open or close the valve, thus causing the inclined surface contacting the tail-piece to ride over the latter for imparting angular movement to the quadrant, and turning the pointer spindle.

4. For use in connection with a valve having an operating spindle, a valve-position indicator comprising a casing adapted to be clamped to the said spindle, a graduated dial in the casing, a pointer mounted on a spindle and adapted to move over the dial under the action of a toothed quadrant pivoted within the casing and meshing with a pinion fast on said pointer spindle, a tailpiece on the said quadrant, and a rod, one end of which extends into the casing and is formed with a plurality of surfaces inclined at different angles relative to the tail-piece, with which any one of the said surfaces is adapted to be brought into contact, whereas the other end of said rod is clamped relatively to a shoe which seats upon the valve body under the action of a spring disposed around the rod and compressed between the casing and the shoe, said rod being caused to project to a greater or lesser extent into said casing during the opening or closing of the valve to cause the inclined surface contacting the tail-piece to ride over the latter and angularly displace the quadrant, thus imparting rotary motion to the pointer spindle.

RICHARD FIFE WALKER.